United States Patent [19]

Liu et al.

[11] Patent Number: 4,563,514

[45] Date of Patent: Jan. 7, 1986

[54] CURABLE POLYSILARYLENE-POLYSILOXANE COPOLYMERS

[75] Inventors: Wan-Li Liu; Jonathan D. Rich, both of Ballston Lake, N.Y.

[73] Assignee: General Electric Company, Waterford, N.Y.

[21] Appl. No.: 716,071

[22] Filed: Mar. 26, 1985

[51] U.S. Cl.[4] .......................................... B05D 3/06
[52] U.S. Cl. .................................... 427/54.1; 522/44; 427/58; 427/82; 427/93; 427/96; 427/387; 428/447; 528/12; 528/21; 528/24; 528/26; 522/99; 522/13; 528/32
[58] Field of Search ....................... 528/32, 26, 24, 21, 528/12, 35; 204/159.13; 427/54.1, 58, 82, 93, 96, 387; 428/447

[56] References Cited

U.S. PATENT DOCUMENTS

| | | | |
|---|---|---|---|
| 3,202,634 | 8/1965 | Merker | 528/35 |
| 4,102,941 | 7/1978 | LaRochelle | 528/21 |
| 4,340,711 | 7/1982 | Evans | 528/21 |
| 4,503,208 | 3/1985 | Lin et al. | 528/26 |
| 4,507,384 | 3/1985 | Morita et al. | 528/26 |

Primary Examiner—Melvyn I. Marquis
Attorney, Agent, or Firm—Gary L. Loser

[57] ABSTRACT

There is provided polysilarylene-polysiloxane copolymers comprising:
(a) at least one unit of the formula

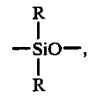

(b) at least one unit of the formula

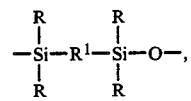

and
(c) at least one unit of the formula

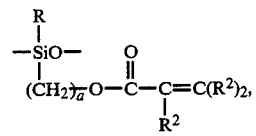

There are also provided curable compositions comprising the instant polymers and a cure initiator, articles having the instant compositions cured to a substrate, and methods for making the aforesaid copolymers, curable compositions and articles.

81 Claims, No Drawings

CURABLE POLYSILARYLENE-POLYSILOXANE COPOLYMERS

BACKGROUND OF THE INVENTION

The present invention relates to ultraviolet (UV) radiation curable polysilarylene-polysiloxane copolymers and compositions made therefrom. More particularly, the present invention relates to UV-curable block copolymers (terpolymers) having silarylenesiloxane, diorganosiloxane and acryloxy-functional siloxane units. The UV-curable copolymers of the present invention can be crosslinked in the presence of a suitable photoinitiator to provide highly transparent, self-bonding, dirt repellent, tough and solvent resistant compositions useful as conformal coatings, electrical insulation, gasketing and the like.

Acryloxy-functional polysiloxanes are well known in the art. For example, Merker in U.S. Pat. No. 2,793,223 discloses acryloxy methyl siloxanes having the formula

where R is hydrogen or methyl, R' is a monovalent hydrocarbon radical, and n has a value from 1 to 2, inclusive. Such acryloxy substituted siloxanes can be copolymerized with siloxanes of the unit formula

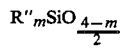

where R″ is a monovalent hydrocarbon radical, an acetoxymethyl radical or a halogenated monovalent hydrocarbon radical, and m has an average value from 1 to 3, inclusive.

Merker, in U.S. Pat. No. 2,922,806, expands upon U.S. Pat. No. 2,793,223 in that the acryloxy or methacryloxy groups are attached to silicon through a divalent alkylene radical having from 2 to 4 carbon atoms.

In U.S. Pat. No. 2,956,044 Merker further teaches that copolymers of acrylate-functional organosilicon units and organic vinylic units (e.g. styrene) exhibit many of the properties of organic vinylic compounds as well as conventional organopolysiloxane compounds. An example of a resulting copolymer would be a copolymer having the general formula

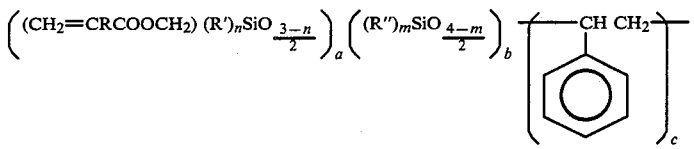

where R, R' and R″ are as previously defined.

Liu, in U.S. patent application Ser. No. 688,489, filed Jan. 3, 1985, and assigned to the same assignee as the present invention, discloses UV-curable block copolymers comprising (a) at least one block consisting essentially of from about 6 to about 120 units of the formula

(b) at least one block consisting essentially of from about 3 to about 160 units of the formula

and (c) at least one block consisting essentially of from about 0.1 to about 20 mole percent of (a) and (b) of units of the formula

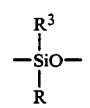

where R is an independently selected alkyl radical having 1 to 5 carbon atoms, aryl radical having 6 to 10 carbon atoms or aralkyl radical having 6 to 10 carbon atoms, $R^1$ is an aryl or aralkyl radical having 6 to 10 carbon atoms, and $R^3$ is an acrylic functional radical of the formula

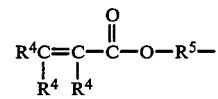

where each $R^4$ is the same or different and represents hydrogen atoms or monovalent substituted or unsubstituted hydrocarbon radicals having from 1 to 12 carbon atoms, and $R^5$ is a divalent substituuted or unsubstituted hydrocarbon radical having from 2 to 12 carbon atoms.

While compositions prepared in accordance with the teachings of the foregoing disclosures generally exhibit good physical properties, it nevertheless is desirable to provide even better compositions which are curable upon exposure to ultraviolet radiation to transparent, self-bonding, dirt repellent and solvent resistant materials. The present applicants have found that such improved UV-curable copolymers can be prepared by incorporating silarylene units in the polymer chain. Even more improved copolymers result when the copolymers of the present invention are block copolymers rather than random copolymers.

Silarylenesiloxane block copolymers are described in the prior art, for example, as in Merker, U.S. Pat. No. 3,202,634, which effect curing by exposing the copolymer to ionizing radiation or by heating the copolymer in the presence of well known catalysts.

Omietanski, U.S. Pat. No. 3,287,310, describes heat curable random copolymers comprised of (a) from 5 to 95 mole percent units of the formula

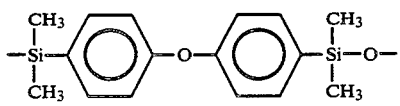

(b) from 5 to 95 mole percent units of the formula

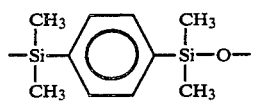

(c) from 0 to 25 mole percent units of the formula

and
(d) from 0 to 1 mole percent units of the formula

where R is a monovalent hydrocarbon radical and R' is an olefinically unsaturated monovalent hydrocarbon radical such as vinyl, allyl, butenyl, cyclohexenyl and the like.

Nowhere, however, does the prior art disclose or suggest ultraviolet radiation curable polyarylene-polysiloxane copolymers of the general formula

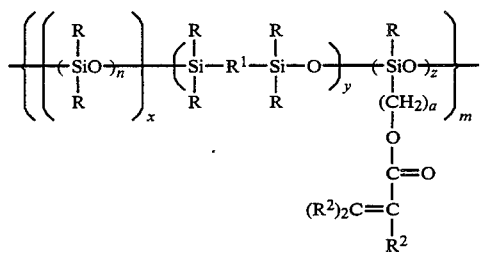

where R is an independently selected $C_{1-13}$ organic radical; preferably methyl, phenyl or a mixture thereof; $R^1$ is an arylene radical, preferably phenylene; $R^2$ is hydrogen or a substituted or unsubstituted alkyl radical, a is an integer from 1 to 12, x, y and z are positive integers, n is an integer which preferably has an average value greater than about 5, and m is a positive integer; which exhibit upon curing, toughness, transparency, self-adhesion, solvent resistance and dirt repellency.

SUMMARY OF THE INVENTION

It is an object of the present invention to provide novel ultraviolet radiation curable polysilarylene-polysiloxane copolymers.

It is another object of the present invention to provide compositions which are highly transparent, self-bonding, dirt repellent, tough and solvent resistant.

Still another object of the present invention is to provide methods for making such UV-curable polysilarylene-polysiloxane copolymers and compositions made therefrom.

In accordance with one aspect of the present invention there is provided a polysilarylene-polysiloxane copolymer comprising:
(a) at least one unit of the formula

(b) at least one unit of the formula

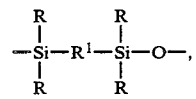

and
(c) at least one unit of the formula

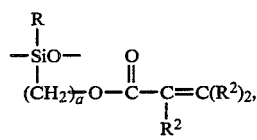

where R is an independently selected organic radical, $R^1$ is an arylene radical, $R^2$ is hydrogen or a substituted or unsubstituted lower alkyl radical, and a is an integer from 1 to 12, inclusive.

Another aspect of the present invention provides a UV-curable composition comprising the aforesaid polysilarylene-polysiloxane and an effective amount of one or more photoinitiators.

DESCRIPTION OF THE INVENTION

A first aspect of the present invention provides a polysilarylene-polysiloxane copolymer, comprising:
(a) at least one unit of the formula

(b) at least one unit of the formula

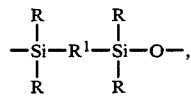

and
(c) at least one unit of the formula

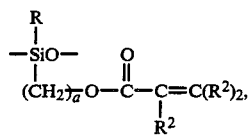

where R is an independently selected organic radical, $R^1$ is an arylene radical, $R^2$ is hydrogen or a substituted or unsubstituted lower alkyl radical and a is an integer from 1 to 12, inclusive.

Generally, R can be any monovalent hydrocarbon radical or halogenated monovalent hydrocarbon radical, and the same or different radicals can be attached to the same or different silicon atoms. Examples of suitable R radicals include alkyl radicals such as methyl, ethyl, and propyl; aryl radicals such as phenyl, xenyl and naphthyl; alkaryl radicals such as tolyl and xylyl; aralkyl radicals such as benzyl; cycloalkyl radicals such as cyclohexyl; unsaturated aliphatic or cycloaliphatic radicals such as vinyl, allyl, propynyl and cyclohexenyl; and halogenated derivatives of any of these such as dibromophenyl, chlorophenyl, tetrachlorxenyl, and 3,3,3-trifluoropropyl.

$R^1$ can be any suitable divalent arylene radical such as, for example, p-phenylene, 4,4'-biphenylene, 4,4'-diphenylene ether, 4,4'-dimethylene benzene and 4,4'-dimethylenediphenyl ether. These radicals are illustrated in the following structural formulas of the corresponding diols:

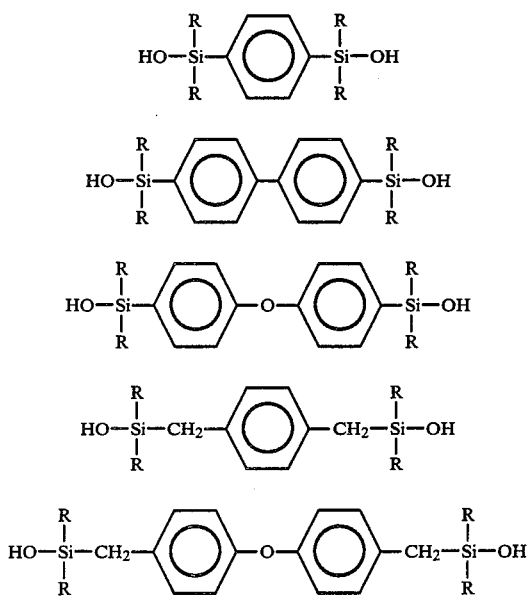

From the foregoing those skilled in the art will be able to select other suitable $R^1$ radicals without undue experimentation.

$R^2$ can be, independently, hydrogen or a lower alkyl radical such as methyl, ethyl, propyl or butyl or a halogenated derivative thereof.

Preferably R is methyl, phenyl or a mixture thereof, $R^1$ p-phenylene, and $R^2$ is, independently, hydrogen or methyl. It is also preferred that a be an integer from 2 to 5, inclusive. More preferably the (a) units are dimethylsiloxy units, the (b) units are bis(dimethylsiloxy) p-phenylene units, and the (c) units are methacryloxypropylmethylsiloxy units or acryloxypropylmethylsiloxy units.

The polysilarylene-polysiloxane copolymers of the present invention can be either random copolymers or block copolymers, however, it is especially preferable that they be block copolymers so as to obtain superior properties. Generally the random copolymers possess virtually no tensile strength until they are filled with a reinforcing filler.

The preferred copolymers of the present invention are block copolymers having the general formula

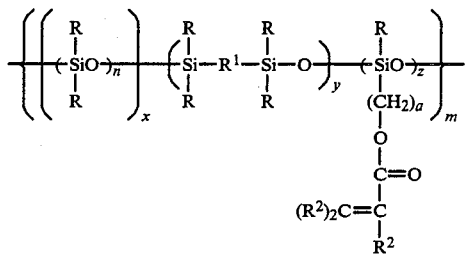

where R, $R^1$, $R^2$, a and n are as previously defined. Preferably the ratio of x:y is from about 10:90 to about 90:10 and more preferably is from about 30:70 to about 70:30. The number of acryloxy-functional siloxy units generally ranges from about 0.1 to about 20 mole percent of the total number of x and y units. Those skilled in the art will be able to adjust these ratios as well as the block chain lengths without the need for undue experimentation in order to obtain compositions having predetermined properties. Preferably n is, on average, from 10 to 100 and m is at least 5.

In addition to the various units discussed hereinabove, there may also be included in the instant copolymers any additional units such as monofunctional, trifunctional and tetrafunctional siloxy units. Of course, these units will not be present in amounts which would adversely affect the properties of compositions prepared from the copolymers of the present invention.

The copolymers of the present invention can be prepared by adapting various methods known in the art for making silarylenesiloxane copolymers. In a particularly preferred method the copolymers of this invention are prepared by reacting, for example, 1,4-bis(chlorodimethylsilyl)benzene, methacryloxypropylmethyldichlorosilane, and a silanol-terminated dimethylpolysiloxane. The 1,4-bis(chlorodimethylsilyl)benzene monomer can be prepared according to the method disclosed by J. Rich in copending U.S. patent application Ser. No. 647,332, filed Sept. 4, 1984, assigned to the same assignee as the present invention and incorporated herein by reference. Briefly, the method of Rich is a one step synthesis involving the reaction of terephthaloyl chloride and 1,2-dichlorotetramethyldisilane in the presence of a suitable catalyst. The silanol-terminated polydiorganosiloxane and acryloxy-functional dichlorosilane can easily be prepared by those of ordinary skill in the art or they can be obtained from a commercial source.

If it is desired to form a random copolymer all of the monomers are simultaneously admixed in a suitable reaction vessel and cohydrolyzed in a solvent such as toluene, xylene or benzene. However, when it is desired to prepare a block copolymer the monomers are admixed in predetermined amounts so as to form blocks having preselected chain lengths. Those of ordinary skill will be able to determine how much of the respective monomers must be added and at what intervals in order to obtain the desired block copolymer.

Another method for preparing the copolymers of the present invention is provided by adapting the method disclosed in U.S. Pat. No. 3,202,634, which patent is incorporated by reference into the instant disclosure. The method of U.S. Pat. No. 3,202,634 generally comprises reacting a silanol-terminated polydiorganosiloxane with either a silarylenesilane diol or a partial condensate thereof in the presence of a condensation catalyst which causes substantially no siloxane rearrangement. Thus, copolymers of the present invention can be prepared simply by including a suitable acryloxy-functional silane diol in the reaction scheme.

From the foregoing it should be appreciated that the copolymers of the present invention are prepared by condensing monomers having hydrolyzable groups. Accordingly, the preferred method for making the copolymers of the invention comprises cohydrolyzing monomers having the general formulas

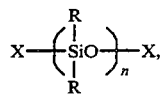 (a)

 (b)

and

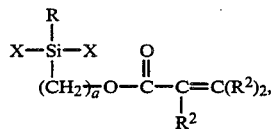 (c)

where R, $R^1$, $R^2$, n and a are as previously defined and X is a hydrolyzable radical such as, for example, Cl or $OR^3$, where $R^3$ is a lower alkyl radical.

Other methods for preparing the copolymers of the present invention can be adapted from U.S. Pat. No. 3,350,350, U.S. Pat. No. 3,959,403, U.S. Pat. No. 4,102,941 and U.S. Pat. No. 4,340,711, all of which are incorporated by reference into the present specification.

The copolymers of the present invention are ordinarily completely soluble in hydrocarbon solvents such as benzene, toluene and xylene. These copolymers can be converted into insoluble silicone elastomers which are tough, highly transparent, self-bonding and dirt resistant by effecting crosslinking of the copolymer chains through the acryloxy-functional radicals in the presence of a suitable cure initiator. Preferably the cure initiator is a photoinitiator and is present in an amount of from about 0.05 to 5 percent by weight based on the weight of the copolymer. Examples of suitable photoinitiators include t-butylperbenzoate, diethoxyacetophenone; amino, nitro and phenol compounds such as p-hydrodiphenyl, p-nitroaniline, 2,6-dichloro-4-nitroaniline, keto compounds such as acetophenone, Michler's ketone; aldehydes such as benzaldehyde; quinones such as benzoquinone and anthroquinone; and anthrone compounds such as 3-methyl-1,3-diazo-1,9-benzanthrone. Other photoinitiators suitable for use in practicing the present invention can be ascertained by the artisan without undue experimentation.

The copolymers of the present invention can also be crosslinked by heating in the presence of well known cure initiators such as, for example, benzoyl peroxide. Similarly, the artisan will appreciate that the copolymers of the present invention can be cured at room temperature in the presence of a suitable initiator such as Fenton's reagent.

The curable compositions of the present invention are prepared simply by admixing the cure initiator with the copolymer. It is possible, of course, to include in the composition one or more well known optional ingredients such as inhibitors, fillers and the like.

The cured compositions of the present invention are substantially transparent, dirt repellent and self bonding, and exhibit excellent toughness and solvent resistance. Normally the curable composition of the present invention is applied to a substrate, for example, an electronic component or device, and thereafter exposed to an amount of ultraviolet radiation or heat (e.g. elevated temperature or room temperature) effective for crosslinking the copolymer. The particular details for curing the compositions of the present invention will depend upon the particular application. However, those skilled in the art will be able to determine optimum curing conditions without undue experimentation.

In order to better enable the artisan to practice the invention, the following examples are provided by way of illustration and not by way of limitation. All parts are by weight unless otherwise stated.

EXAMPLES

EXAMPLE 1

Twenty five grams of silanol-terminated polydimethylsiloxane having an average of 24 repeating units per molecule, 95 grams of toluene, and 500 grams of water were admixed in a three-necked flask equipped with a thermometer and a stirrer. In a pre-dried flask, 50 grams of 1,4-bis(chlorodimethylsilyl)benzene, 4,4 grams of methacryloxypropylmethyldichlorosilane, and 95 grams of dry toluene were mixed and, thereafter, added through a Teflon ® tube to the dispersion contained in the three-necked flask over a period of about two minutes. Agitation was sufficient to maintain the dispersion and the reaction temperature was in the range of 25° C. to 32° C. The dispersion was stirred for thirty minutes after completion of the addition at which time the aqueous phase was separated from the organopolysiloxane phase with a separatory funnel. The organopolysiloxane layer was washed four times with distilled water and then azeotroped for one hour to remove any residual water or acid. The resultant block copolymer was bodied at 115° C.–120° C. for 16 hours. After being cooled to room temperature, the solution was stirred with Celite 545 and Fuller's Earth for one hour and then filtered.

EXAMPLE 2

Twenty five grams of silanol-terminated polydimethylsiloxane having an average of 24 repeating units per molecule, 95 grams of toluene, and 500 grams of water were placed into a three necked flask equipped with a thermometer and a stirrer, and admixed to form a dispersion. In a pre-dried flask, 75 grams of 1,4-bis(chlorodimethylsilyl)benzene, 4.8 grams of phenyltrichlorosilane, 5.0 grams of methacryloxypropylmethyldichlorosilane, and 90 grams of dry toluene were mixed and, thereafter, added through a Teflon tube to the dispersion over a period of about two minutes. The reaction temperature increased from 24° C. to 39° C. Agitation sufficient to maintain the dispersion was continued for thirty minutes after completion of the addition. The aqueous phase was separated from the organopolysiloxane phase with a separatory funnel. The organopolysiloxane layer was washed twice with distilled water and then azeotroped for one hour to remove any residual water or acid. The resultant resinous block copolymer was bodied with 20 ppm of zinc octoate at 115° C.–120° C. for 24 hours. After being cooled to room temperature, the solution was stirred with Fuller's Earth and Celite 545 for one hour and then filtered.

EXAMPLE 3

One hundred parts of the copolymer of Example 1 and one hundred parts of the copolymer of Example 2 were each admixed with one part of photoinitiator (a mixture of t-butylperbenzoate and diethoxyacetophenone) and cast on glass plates. The coated glass plates were then irradiated with ultraviolet light under the following conditions:
Line Speed=20 ft/min.
430 A.C. Watts
7 Ampheres
Nitrogen Atmosphere.
Highly transparent compositions having excellent toughness, adhesion, dirt repellency and solvent resistance were obtained.

We claim:

1. A polysilarylene-polysiloxane copolymer, comprising:

(a) at least one unit of the formula

(b) at least one unit of the formula

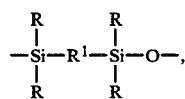

and (c) at least one unit of the formula

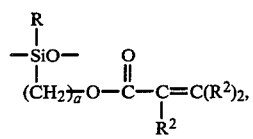

where each R is an independently selected organic radical, $R^1$ is a divalent arylene radical, each $R^2$ is independently selected from hydrogen, and substituted and unsubstituted lower alkyl radicals, and a is an integer from 1 to 12, inclusive.

2. A copolymer as in claim 1, wherein said copolymer is a block copolymer.

3. A copolymer as in claim 1, wherein R is methyl, phenyl or a mixture thereof.

4. A copolymer as in claim 1 or 3, wherein $R^1$ is selected from the group consisting of p-phenylene, 4,4'-biphenylene, 4,4' diphenylene ether, 4,4-dimethylene benzene, and 4,4'-dimethylenediphenyl ether.

5. A copolymer as in claim 4, wherein the (c) units are acryloxypropylmethylsiloxy units or methacryloxypropylmethylsiloxy units.

6. A copolymer as in claim 1, wherein said copolymer has the general formula

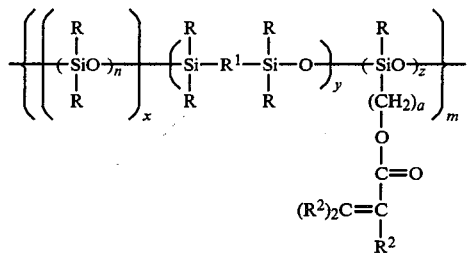

where each R is an independently selected organic radical, $R^1$ is a divalent arylene radical, each $R^2$ is independently selected from hydrogen and substituted and unsubstituted lower alkyl radicals, a is an integer from 1 to 12, inclusive, n has an average value greater than 5; m, x, y and z are each positive integers.

7. A copolymer as in claim 6, wherein the molar ratio of x:y is from about 10:90 to about 90:10.

8. A copolymer as in claim 6, wherein the molar ratio of x:y is from about 30:70 to about 70:30.

9. A copolymer as in claim 7 or 8, wherein the number of acryloxy-functional siloxy units is from about 0.1 to about 20 mole percent of the total number of x and y units.

10. A copolymer as in claim 9, wherein n has an average value from 10 to 100 and m is an integer equal to or greater than 5.

11. A method for making polysilarylene-polysiloxane copolymers, comprising:

I. condensing monomers having the general formulas:

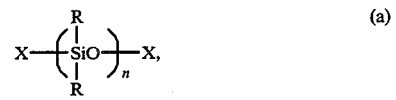 (a)

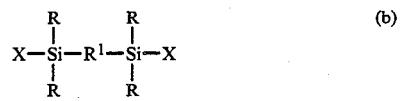 (b)

and

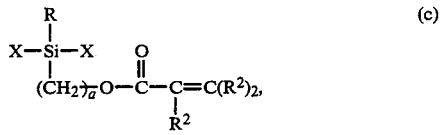 (c)

where R is an independently selected organic radical, $R^1$ is a divalent arylene radical, each $R^2$ is independently selected from hydrogen and substituted and unsubstituted lower alkyl radicals, a is an integer from 1 to 12, n is a positive integer, and X is a hydrolyzable radical.

12. A method as in claim 11, wherein the monomers are condensed in a predetermined order in predetermined amounts so as to provide a block copolymer.

13. A method as in claim 11, wherein R is methyl, phenyl or a mixture thereof.

14. A method as in claim 11 or 13, wherein $R^1$ is selected from the group consisting of p-phenylene, 4,4'-bisphenylene, 4,4'-diphenylene ether, 4,4'-dimethylene benzene, and 4,4'-dimethylenediphenyl ether.

15. A method as in claim 14, wherein the monomers of (c) are selected from compounds having the general formula

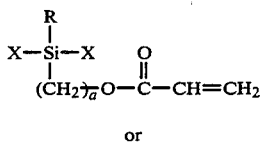

or

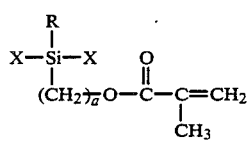

where R is an independently selected organic radical, a is an integer from 1 to 12, and X is a hydrolyzable radical.

16. A method as in claim 15, wherein a equals 3.

17. A method as in claim 11, wherein the molar ratio of monomers of (a) to monomers of (b) is from about 10:90 to about 90:10.

18. A method as in claim 17, wherein the molar ratio of monomers of (a) to monomers of (b) is from about 30:70 to about 70:30.

19. A method as in claim 17 or 18, wherein the amount of monomer (c) is from about 0.1 to about 20 mole percent of the number of moles of (a) and (b).

20. A method as in claim 11, wherein the condensation is effected in a hydrocarbon solvent.

21. A method as in claim 20, wherein the hydrocarbon solvent is selected from the group consisting of benzene, toluene and xylene.

22. A curable composition, comprising:
I. a polysilarylene-polysiloxane copolymer, comprising:
(a) at least one unit of the formula

(b) at least one unit of the formula

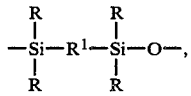

and
(c) at least one unit of the formula

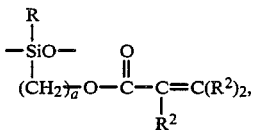

where each R is an independently selected organic radical, $R^1$ is a divalent arylene radical, each $R^2$ is independently selected from hydrogen, and substituted and unsubstituted lower alkyl radicals, and a is an integer from 1 to 12, inclusive; and II. an amount of cure initiator effective for promoting crosslinking of said copolymer.

23. A composition as in claim 22, wherein said copolymer is a block copolymer.

24. A composition as in claim 22, wherein R is methyl, phenyl, or a mixture thereof.

25. A composition as in claim 22 or 24, wherein $R^1$ is selected from the group consisting of p-phenylene, 4,4'-bisphenylene, 4,4' diphenylene ether, 4,4' dimethylene benzene, and 4,4'-dimethylenediphenyl ether.

26. A composition as in claim 25, wherein the (c) units are acryloxypropylmethylsiloxy units or methacryloxypropylmethylsiloxy units.

27. A composition as in claim 22, wherein the copolymer has the general formula

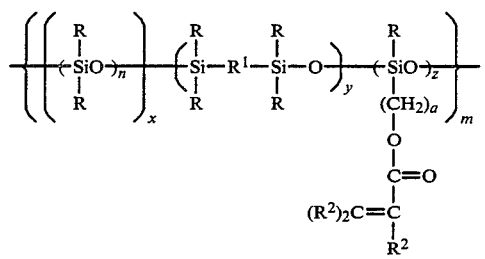

where each R is an independently selected organic radical, $R^1$ is a divalent arylene radical, each $R^2$ is independently selected from hydrogen and substituted and unsubstituted lower alkyl radicals, a is an integer from 1 to 12, inclusive, n has an average value greater than 5; m, x, y and z are each positive integers.

28. A composition as in claim 27, wherein the molar ratio of x:y is from about 10:90 to about 90:10.

29. A composition as in claim 27, wherein the molar ratio of x:y is from about 30:70 to about 70:30.

30. A composition as in claim 28 or 29, wherein the number of moles of acryloxy-functional siloxy units is from about 0.1 to about 20 mole percent of the total number of x and y units.

31. A composition as in claim 30, wherein n has an average value from 10 to 100 and m is an integer equal to or greater than 5.

32. A composition as in claim 22, wherein the cure initiator is a photoinitiator.

33. A composition as in claim 22, wherein the cure initiator is a heat cure initiator.

34. A composition as in claim 22, wherein the cure initiator is a room temperature cure initiator.

35. A composition as in claim 32, wherein the photoinitiator is t-butylperbenzoate, diethoxyacetophenone or a mixture thereof.

36. A composition as in claim 33, wherein the heat cure initiator is a peroxide.

37. A composition as in claim 34, wherein the room temperature cure initiator is Fenton's reagent.

38. A method for making a curable composition, comprising mixing:
I. a polysilarylene-polysiloxane copolymer, comprising:
(a) at least one unit of the formula

(b) at least one unit of the formula

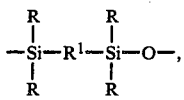

and (c) at least one unit of the formula

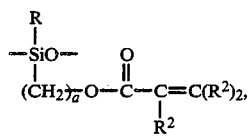

where each R is an independently selected organic radical, $R^1$ is a divalent arylene radical, each $R^2$ is independently selected from hydrogen, and substituted and unsubstituted lower alkyl radicals, and a is an integer from 1 to 12, inclusive; and II. an amount of cure initiator effective for promoting crosslinking of said copolymer.

39. A method as in claim 38, wherein said copolymer is a block copolymer.

40. A method as in claim 38, wherein R is methyl, phenyl or a mixture thereof.

41. A method as in claim 38 or 40, wherein $R^1$ is selected from the group consisting of p-phenylene, 4,4-biphenylene, 4,4' diphenylene ether, 4,4' dimethylene benzene, and 4,4'-dimethylenediphenyl ether.

42. A method as in claim 41, wherein the (c) units are acryloxypropylmethylsiloxy units or methacryloxypropylmethylsiloxy units.

43. A method as in claim 38, wherein the copolymer has the general formula

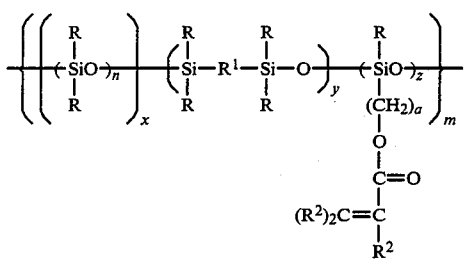

where each R is an independently selected organic radical, $R^1$ is a divalent arylene radical, each $R^2$ is independently selected from hydrogen and substituted and unsubstituted lower alkyl radicals, a is an integer from 1 to 12, inclusive, n has an average value greater than 5; m, x, y and z are each positive integers.

44. A method as in claim 43, wherein the molar ratio of x:y is from about 10:90 to about 90:10.

45. A method as in claim 43, wherein the molar ratio of x:y is from about 30:70 to about 70:30.

46. A method as in claim 44 or 45, wherein the number of moles of acryloxy-functional siloxy units in from about 0.1 to about 20 mole percent of the total number of x and y units.

47. A method as in claim 46, wherein n has an average value from 10 to 100 and m is an integer equal to or greater than 5.

48. A method as in claim 38, wherein the cure initiator is a photoinitiator.

49. A method as in claim 38, wherein the cure initiator is a heat cure initiator.

50. A method as in claim 38, wherein the cure initiator is a room temperature cure initiator.

51. A method as in claim 48, wherein the photoinitiator is t-butylperbenzoate, diethyoxyacetophenone or a mixture thereof.

52. A method as in claim 49, wherein the heat cure initiator is a peroxide.

53. A method as in claim 50, wherein the room temperature cure initiator is Fenton's reagent.

54. An article of manufacture comprising a substrate having disposed on at least one surface thereof a cured coating made from a composition comprising:

I. a polysilarylene-polysiloxane copolymer, comprising:

(a) at least one unit of the formula

(b) at least one unit of the formula

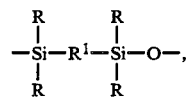

and (c) at least one unit of the formula

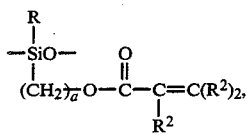

where each R is an independently selected organic radical, $R^1$ is a divalent arylene radical, each $R^2$ is independently selected from hydrogen, and substituted and unsubstituted lower alkyl radicals, and a is an integer from 1 to 12, inclusive; and II. an amount of cure initiator effective for promoting crosslinking of said copolymer.

55. An article as in claim 54, wherein said copolymer is a block copolymer.

56. An article as in claim 54, wherein R is methyl, phenyl or a mixture thereof.

57. An article as in claim 54 or 56 wherein $R^1$ is selected from the group consisting of p-phenylene, 4,4-biphenylene, 4,4' diphenylene ether, 4,4' dimethylene benzene, and 4,4'-dimethylenediphenyl ether.

58. An article as in claim 57, wherein the (c) units are acryloxypropylmethylsiloxy units or methacryloxypropylmethylsiloxy units.

59. An article as in claim 54, wherein the copolymer has the general formula

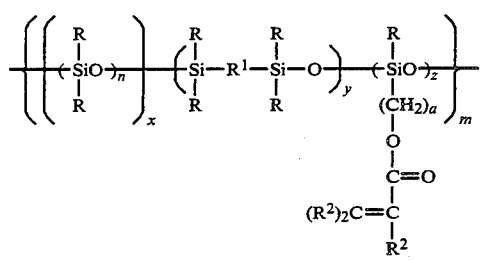

where each R is an independently selected organic radical, $R^1$ is a divalent arylene radical, each $R^2$ is independently selected from hydrogen and substituted and unsubstituted lower alkyl radicals, a is an integer from 1 to 12, inclusive, n has an average value greater than 5; m, x, y and z are each positive integers.

60. An article as in claim 59, wherein the molar ratio of x:y is from about 10:90 to about 90:10.

61. An article as in claim 59, wherein the molar ratio of x:y is from about 30:70 to about 70:30.

62. An article as in claim 60 or 61, wherein the number of moles of acryloxy-functional siloxy units is from about 0.1 to about 20 mole percent of the total number of x and y units.

63. An article as in claim 62, wherein n has an average value from 10 to 100 and m is an integer equal to or greater than 5.

64. An article as in claim 54, wherein the cure initiator is a photoinitiator.

65. An article as in claim 54, wherein the cure initiator is a heat cure initiator.

66. An article as in claim 54, wherein the cure initiator is a room temperature cure initiator.

67. An article as in claim 54, wherein the substrate is an electronic component or electronic device.

68. A method for making an article of manufacture, comprising:

I. applying to a substrate a curable composition comprising:

(A) a polysilarylene-polysiloxane copolymer, comprising:

(a) at least one unit of the formula

(b) at least one unit of the formula

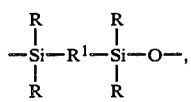

and (c) at least one unit of the formula

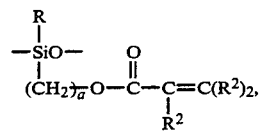

where each R is an independently selected organic radical, $R^1$ is a divalent arylene radical, each $R^2$ is independently selected from hydrogen, and substituted and unsubstituted lower alkyl radicals, and a is an integer from 1 to 12, inclusive; and (B) an amount of cure initiator effective for promoting crosslinking of said copolymer; and II. curing said composition to said substrate.

69. A method as in claim 68, wherein said copolymer is a block copolymer.

70. A method as in claim 68, wherein R is methyl, phenyl or a mixture thereof.

71. A method as in claim 68 or 70, wherein $R^1$ is selected from the group consisting of p-phenylene, 4,4'-biphenylene, 4,4'-diphenylene ether, 4,4' dimethylene benzene and 4,4'-dimethylenediphenyl ether.

72. A method as in claim 71, wherein the (c) units are acryloxypropylmethylsiloxy units or methacryloxypropylmethylsiloxy units.

73. A method as in claim 68, wherein the copolymer has the general formula

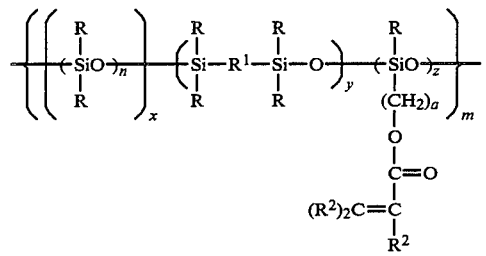

where each R is an independently selected organic radical, $R^1$ is a divalent arylene radical, each $R^2$ is independently selected from hydrogen and substituted and unsubstituted lower alkyl radicals, a is an integer from 1 to 12, inclusive, n has an average value greater than 5; m, x, y and z are each positive integers.

74. A method as in claim 73, wherein the molar ratio of x:y is from about 10:90 to about 90:10.

75. A method as in claim 73, wherein the molar ratio of x:y is from about 30:70 to about 70:30.

76. A method as in claim 74 or 75, wherein the number of moles of acryloxy-functional siloxy units is from about 0.1 to about 20 mole percent of the number of x and y units.

77. A method as in claim 76, wherein n has an average value from 10 to 100 and m is an integer equal to or greater than 5.

78. A method as in claim 68, wherein the cure initiator is a photoinitiator.

79. A method as in claim 68, wherein the cure initiator is a heat cure initiator.

80. A method as in claim 68, wherein the cure initiator is a room temperature cure initiator.

81. A method as in claim 54, wherein the substrate is an electronic component or electronic device.

* * * * *